US012594864B2

(12) United States Patent
Barlow et al.

(10) Patent No.: US 12,594,864 B2
(45) Date of Patent: Apr. 7, 2026

(54) DRAW-IN BAR FOR HOLDING A COVER, COVER FASTENING SYSTEM AND VEHICLE SEAT

(71) Applicant: Adient US LLC, Plymouth, MI (US)

(72) Inventors: Iain David Barlow, Stevenage (GB); Miloš Mičátek, Trenčín (SK)

(73) Assignee: Adient US LLC, Plymouth, MI (US)

( * ) Notice: Subject to any disclaimer, the term of this patent is extended or adjusted under 35 U.S.C. 154(b) by 228 days.

(21) Appl. No.: 18/484,472

(22) Filed: Oct. 11, 2023

(65) Prior Publication Data

US 2024/0131973 A1 Apr. 25, 2024

(30) Foreign Application Priority Data

Oct. 12, 2022 (DE) ...................... 10 2022 126 504.8

(51) Int. Cl.
*B60N 2/58* (2006.01)

(52) U.S. Cl.
CPC .................................. *B60N 2/5825* (2013.01)

(58) Field of Classification Search
CPC .................................................. B60N 2/5825
See application file for complete search history.

(56) References Cited

U.S. PATENT DOCUMENTS 3,661,689 A 5/1972 Spanier
4,715,651 A * 12/1987 Wakamatsu ......... B60N 2/5825
297/452.59

5,187,843 A 2/1993 Lynch
2016/0249746 A1* 9/2016 Saiga ................... A47C 31/023
24/545
2018/0236915 A1 8/2018 Agonia et al.
2022/0080866 A1* 3/2022 Matsumoto .......... B60N 2/5891

FOREIGN PATENT DOCUMENTS

DE 10056887 A1 6/2001
DE 202004017050 U1 1/2005
DE 202005013339 U1 11/2005
DE 112013007582 T5 7/2016
DE 112016006628 T5 12/2018
FR 2735960 A1 1/1997
JP H06304351 A 11/1994
KR 101524087 B1 5/2015
KR 1020190135758 A 12/2019
WO 2023120262 A1 6/2023

* cited by examiner

*Primary Examiner* — David R Dunn
*Assistant Examiner* — Tania Abraham
(74) *Attorney, Agent, or Firm* — Marshall & Melhorn, LLC

(57) ABSTRACT

A draw-in bar for holding a cover of a vehicle seat on at least one latching receiving element, the draw-in bar having a profile body. The profile body has at least one first profile section with a basic cross section that is constant along a direction of longitudinal extent of the profile body and at least one second profile section with a safety cross section. The safety cross section projects beyond the basic cross section of the profile body in at least one transverse direction in the second profile section. A cover fastening system for a vehicle seat may have the latching receiving element and the draw-in bar where the draw-in bar is connectable to the latching receiving element by a latching connection.

17 Claims, 5 Drawing Sheets

DRAW-IN BAR FOR HOLDING A COVER, COVER FASTENING SYSTEM AND VEHICLE SEAT

FIELD

The invention relates to a draw-in bar for holding a cover of a vehicle seat on at least one latching receiving element, in particular on at least one latching receiving element connected to a foam part of the vehicle seat; the draw-in bar having a profile body, wherein the profile body has at least one first profile section with a basic cross section that is constant along a direction of longitudinal extent of the profile body.

BACKGROUND

The prior art discloses draw-in bars for holding seat covers of padded vehicle seats, in particular seat covers having a cover material composed of a textile material and/or a leather. These draw-in bars usually have a profile body, which is manufactured from plastic, and a seam tab. In order to fasten the cover material to a padding material, in particular to a foam part of the vehicle seat, the cover material is connected, in particular stitched, to the seam tab of the draw-in bar. The draw-in bar connected to the cover material is then drawn into recesses in the padding material and fixed to latching receiving elements, so that the cover material forms what is known as a blind seam.

DE 20 2004 017 050 U1 discloses a draw-in bar for holding seat covers composed of cloth and/or leather on padding materials, in particular foam parts of vehicle seats. The draw-in bar has a profile body, which is formed from a plastic strand, and a seam tab, wherein the seam tab is connectable, in particular stitchable, to a cover material of the cover. The profile body of the draw-in bar is provided with at least one mould which runs transversely to a strand direction (longitudinal central plane) and defines a preferred bending region of the draw-in bar.

DE 20 2005 013 339 U1 discloses a latching receiving element having at least one base on which latching tongues with latching projections are arranged, it being possible for a draw-in bar of a cover to be latched between the latching tongues. A profile body of the draw-in bar can be pushed into the latching receiving element, in particular into a plurality of latching receiving elements spaced apart from each other. During the pushing-in process, a latching connection is made, in the case of which the profile body initially pushes the correspondingly profiled latching tongues apart, until the latching projections on the latching tongue are overcome and the profile body is held largely in the intermediate space between the latching tongues below the latching projections acting as barbs. The cover is connectable to the latching receiving elements in this way. The profile body can be displaced along a strand direction of the profile body in the latching receiving element, possibly after overcoming a small amount of friction.

SUMMARY

The invention is based on the problem of improving a draw-in bar for holding seat covers of the kind mentioned at the outset and as a result providing a cover fastening system which allows vehicle seats of high optical quality, in particular a vehicle seat with fold-free seat covers over the service life of the vehicle.

According to the invention, this problem is solved by a draw-in bar for holding a cover of a vehicle seat on at least one latching receiving element, in particular on at least one latching receiving element connected to a foam part of the vehicle seat; the draw-in bar having a profile body, wherein the profile body has at least one first profile section with a basic cross section that is constant along a direction of longitudinal extent of the profile body, and the profile body has at least one second profile section with a safety cross section, wherein the safety cross section projects beyond the basic cross section of the profile body in at least one transverse direction in the second profile section.

The profile body has, in the direction of the direction of longitudinal extent, an elongate extent. The profile body can have a linear extent, wherein the direction of longitudinal extent then also runs in a correspondingly linear manner. The profile body can run in a curved manner along the direction of longitudinal extent, in particular due to an elastic deformation of the profile body, wherein the direction of longitudinal extent then also runs in a correspondingly curved manner.

The basic cross section represents a section in the first profile section perpendicular to the direction of longitudinal extent through the profile body. The safety cross section represents a section in the second profile section perpendicular to the direction of longitudinal extent through the profile body. The length of the profile body in the direction of the direction of longitudinal extent is several times greater than the extent of the basic cross section in a first transverse direction and in a second transverse direction, wherein the first transverse direction and the second transverse direction are each perpendicular to the direction of longitudinal extent, and the first transverse direction is perpendicular to the second transverse direction. The second transverse direction can lie in a plane of symmetry of the profile body.

The basic cross section of the profile body can be constant between two adjacent safety cross sections in each case. The basic cross section of the profile body can be constant in all profile sections outside the safety cross section.

Since the profile body has at least one second profile section with a safety cross section, wherein the safety cross section projects beyond the basic cross section of the profile body in at least one transverse direction in the second profile section, it is possible for a latching receiving element interacting with the draw-in bar to slide only within the first profile section. After a limited relative displacement between the first profile section of the profile body and the latching receiving element, the second profile section, by way of its safety cross section that is larger than the basic cross section, comes into interlocking contact with the latching receiving element, as a result of which further relative displacement between the draw-in bar and the latching receiving element is avoided. In this way, the draw-in bar is secured against being displaced any further in the latching receiving element. This protects against the formation of folds in a cover material connected to the draw-in bar, in particular to a seam tab of the draw-in bar. A formation of folds in a cover due to the draw-in bar slipping in the latching receiving element is avoided.

The profile body can have a safety cross section in each of a plurality of second profile sections spaced apart from each other in the direction of longitudinal extent. First and second profile sections preferably regularly alternate with each other in the direction of longitudinal extent. The length of a second profile section in the direction of longitudinal extent is, for example, 5 mm to 15 mm, in particular 10 mm. The length of a first profile section is preferably greater than 15 mm.

The at least one safety cross section can project beyond the basic cross section in a first transverse direction. The at least one safety cross section can project beyond the basic cross section on both sides in and counter to the first transverse direction. However, in a second transverse direction running perpendicularly to the first transverse direction, a height of the safety cross section can correspond to a height of the basic cross section.

The at least one safety cross section of the profile body can differ from the basic cross section on account of at least one material accumulation, in particular in the form of at least one projection. The at least one material accumulation is manufactured in one piece with the profile body. Each second profile section can have precisely two material accumulations, which face away from each other and project beyond the basic cross section on both sides.

The at least one safety cross section of the profile body is preferably designed in such a way that the profile body, in interaction with a latching receiving element, can prevent a displacement in the direction of longitudinal extent up to a defined force in the direction of longitudinal extent, preferably up to a force of 100 N. Owing to elastic and/or plastic deformation of the safety cross section and/or of the latching receiving element, the safety cross section can pass through the latching receiving element under considerably higher forces. However, this does not present a problem since high forces of this kind do not occur during normal operation of the profile body.

The profile body can be manufactured from a plastic. The profile body can be an extruded profile body. The profile body can be a semi-finished product. The profile body can be a semi-finished product that has been cut to length. The profile body can have, in addition to the material accumulations, punched-out portions, in particular in the at least one first profile section.

The draw-in bar can have a seam tab. The seam tab can be connected to the profile body. The seam tab can be connectable, in particular stitchable, to a cover material of a cover. The seam tab can be manufactured from a non-woven fabric. The seam tab can be manufactured from a plastic.

The problem is also solved by a cover fastening system, having a latching receiving element and an above-described draw-in bar. The draw-in bar is connectable to the latching receiving element by a latching connection.

The latching receiving element can have a base and at least one latching tongue connected to the base. The latching tongue can have at least one latching projection, in particular acting as a barb for the profile body.

The latching receiving element can have two latching tongues. The two latching tongues can be arranged and designed in such a way that the two latching tongues can be pushed apart by the profile body by pushing the profile body of the draw-in bar, in particular counter to a second transverse direction, between the two latching tongues, as a result of which the latching projections of the latching tongues can be guided past the profile body, and in this way a first profile section of the profile body, said first profile section having the basic cross section, can be inserted into an intermediate space between the latching tongues.

The basic cross section of the profile body can have a first width. The safety cross section of the profile body can have a second width. The intermediate space between the latching tongues can have a third width. The first width, the second width and the third width can be matched to each other in such a way that the first profile section of the profile body, said first profile section having the basic cross section, is displaceable relative to the latching tongues in the direction of longitudinal extent until the second profile section having the safety cross section comes into interlocking contact with at least one of the latching tongues.

The profile body can have an arrow-like cross section. The profile body can have an arrow-like basic cross section. The profile body can have an arrow-like safety cross section. A maximum width of the basic cross section in the first transverse direction is, for example, 5.5 mm. A maximum width of the safety cross section in the first transverse direction is, for example, 6.5 mm. However, differing combinations of maximum widths are also possible, provided that the width of the safety cross section prevents passage of the second profile section through the latching receiving element.

The latching receiving element can be incorporated by foaming into a foam part. A base of the latching receiving element can have holes which foamable material enters during the foaming process of the foam part.

The problem is also solved by a vehicle seat, having at least one foam part and at least one cover covering the at least one foam part, wherein the cover is connected to the at least one foam part by at least one cover fastening system.

In summary, and in other words, the invention provides protection against undesirably large displacement of a cover relative to a latching receiving element. Undesirably severe sliding of a draw-in bar stitched to the cover material of the cover relative to the latching receiving element is prevented. As a result, a formation of folds in the cover due to the draw-in bar slipping in the latching receiving element can be avoided.

Figures and embodiments of the invention

DESCRIPTION OF THE FIGURES

The invention is explained in greater detail below with reference to advantageous exemplary embodiments illustrated in the figures. However, the invention is not restricted to these exemplary embodiments. In the figures.

DETAILED DESCRIPTION

Figures 1, 2:
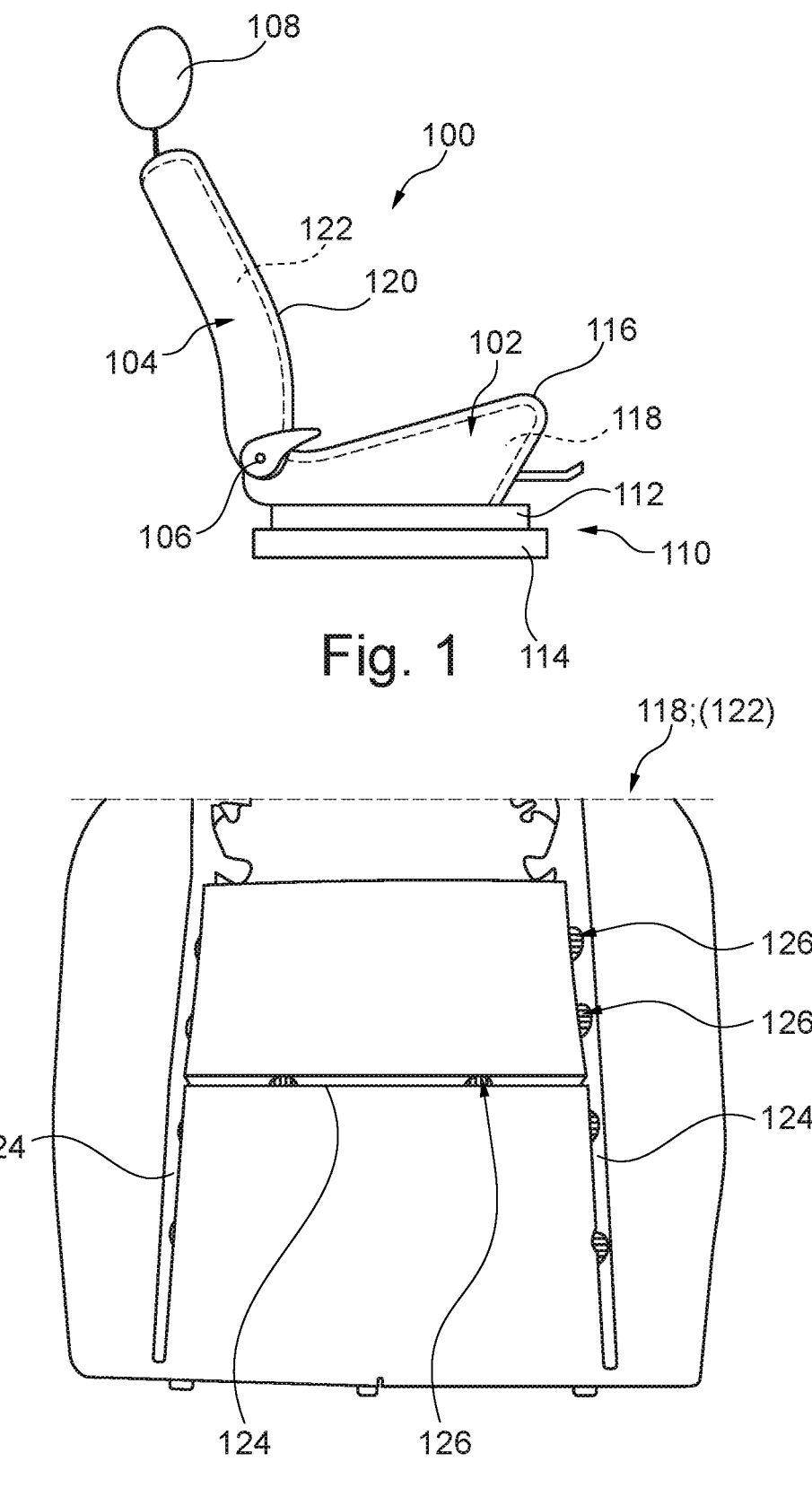
FIG. 1: shows a side view of a vehicle seat according to the invention.
FIG. 2: shows a plan view of a foam part of the vehicle seat from FIG. 1.
Figure 3:
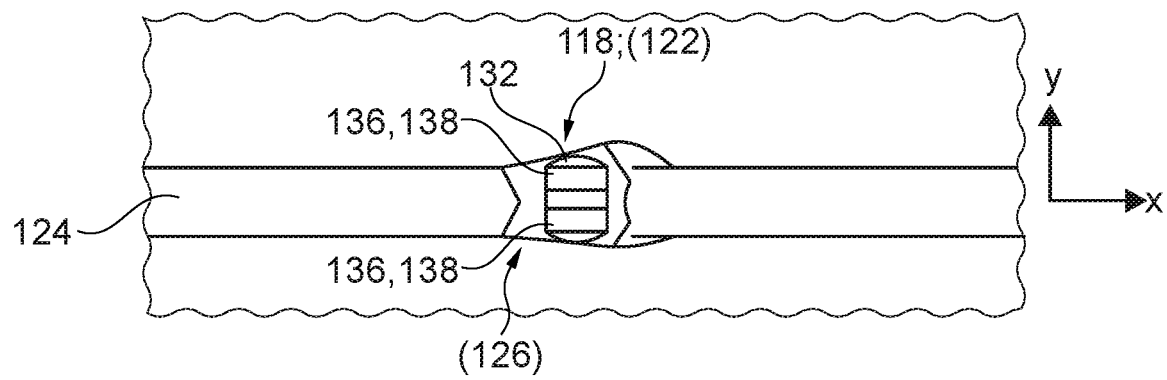
FIG. 3: shows a view of a detail of the foam part from FIG. 2 in the region of a latching receiving element incorporated by foaming.

FIG. 1 shows a vehicle seat 100 according to the invention. The vehicle seat 100 has a seat part 102 and a backrest 104 which are connected to each other by two fittings 106 in the present case. A headrest 108 is arranged in the region of an upper edge of the backrest 104.

The seat part 102 has a supporting structure which is connected in a longitudinally adjustable manner to a vehicle floor by a longitudinal adjuster 110. The longitudinal adjuster 110 has an upper track 112 connected to the supporting structure of the seat part 102 and a lower track 114 connectable to the vehicle floor. The upper track 112 is mounted in a relatively displaceable manner on the bottom track 114.

The supporting structure of the seat part 102 supports at least one padded part of the seat part 102. The padded part of the seat part 102 comprises a foam part 118 and a cover 116 covering the foam part 118. The foam part 118 is covered by the cover 116, which is manufactured in particular substantially from a cover material composed of a textile material and/or from a leather.

The supporting structure of the backrest 104 supports a padded part of the backrest 104. The padded part of the backrest 104 comprises a foam part 122 and a cover 120 covering the foam part 122. The foam part 122 is covered by the cover 120, which is manufactured in particular substantially from a cover material composed of a textile material and/or from a leather.

Analogously, the headrest 108 can also have a structure which supports a padded part, comprising a foam part and a cover covering the foam part. An optional armrest, not illustrated in the figures, can also be constructed in an analogous manner.

The covers 116, 120 are each connected to the associated foam part 118, 122 along groove-like recesses 124 in the foam parts 118, 122 by at least one cover fastening system 126. In FIGS. 2 to 11, the cover fastening system 126 is described, by way of example, in terms of use for fastening the cover 116 to the foam part 118 of the seat part 102. However, the cover fastening system 126 can also be combined with the foam part 122 of the backrest 104 or a foam part of another part of the vehicle seat 100, for example the headrest 108, in an analogous manner.

The cover fastening system 126 has at least one latching receiving element 130 and at least one draw-in bar 140 which can be latched into the latching receiving element 130. FIG. 2 shows a plan view of the foam part 118 of the seat part 102 before fastening the associated cover 116. The foam part 118 has three recesses 124 in the present case, but could also have a different number of recesses 124. Several latching receiving elements 130 of identical design are also arranged spaced apart from each other in the recesses 124.

Figure 4:
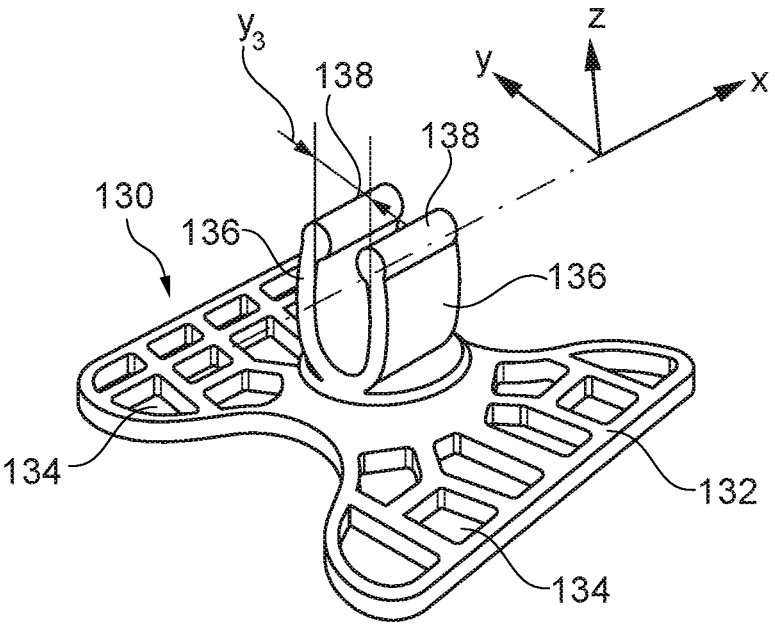
FIG. 4: shows a perspective view of the latching receiving element.
Figure 5:
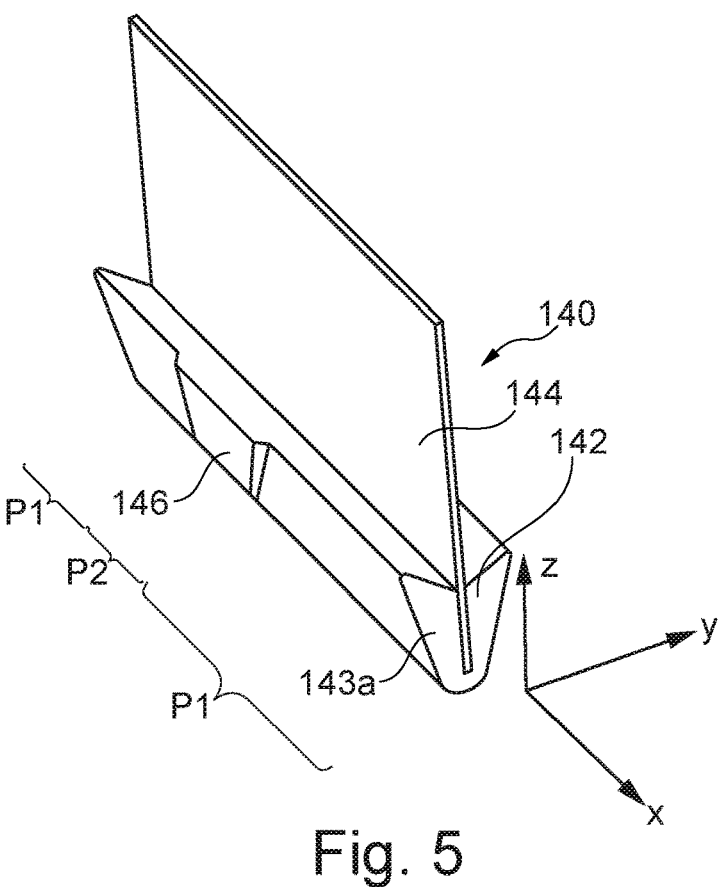
FIG. 5: shows a perspective view of a draw-in bar according to the invention.
Figure 6:
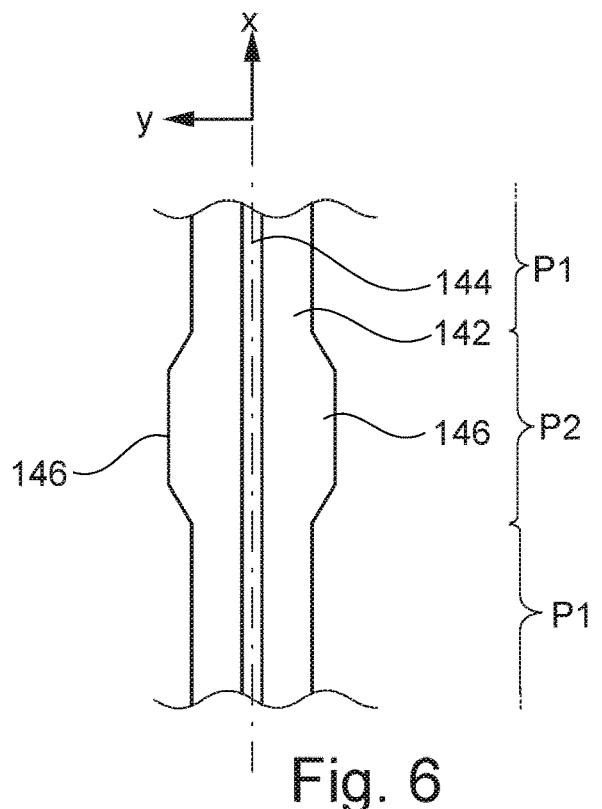
FIG. 6: shows a plan view of the draw-in bar from FIG. 5, FIG. 7: shows a perspective view of a cover fastening system according to the invention, having a latching receiving element and a draw-in bar according to the invention, wherein a first profile section of the draw-in bar is latched into the latching receiving element, and two second profile sections are each arranged spaced apart from the latching receiving element.
Figure 7:
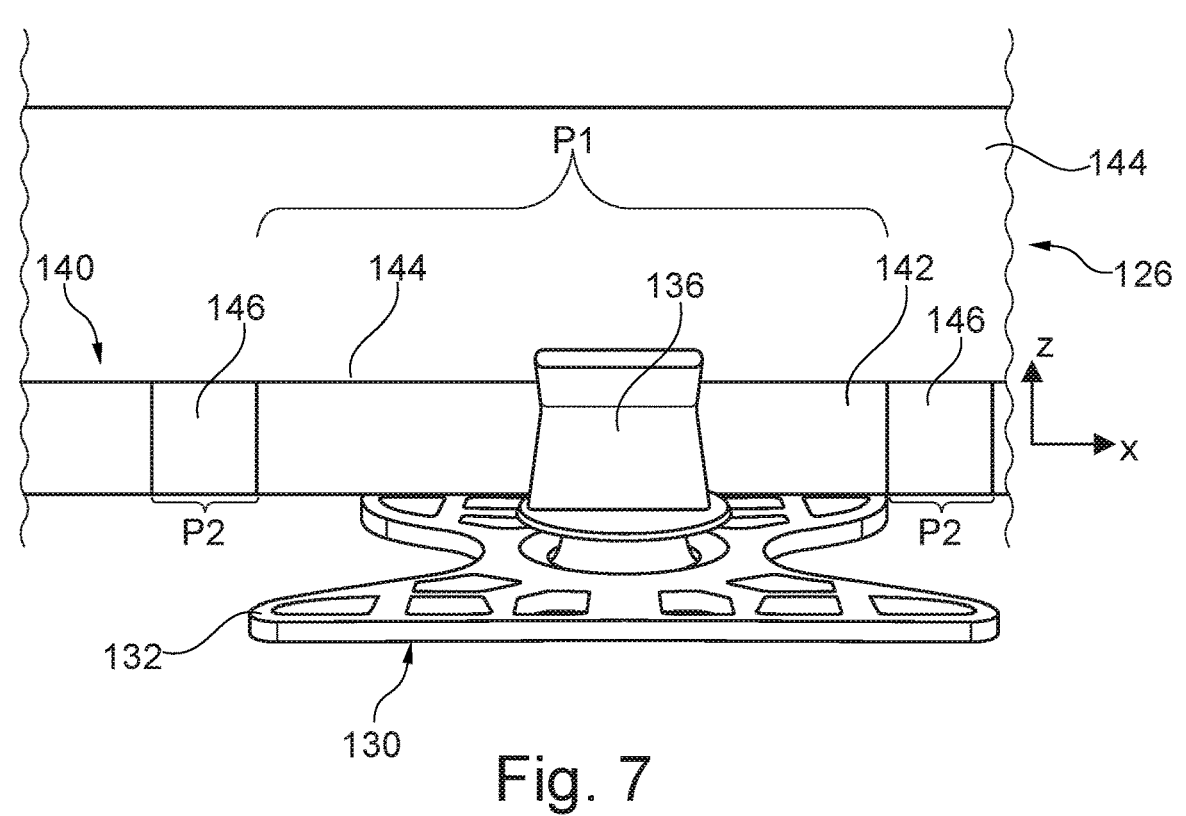
Figure 8:
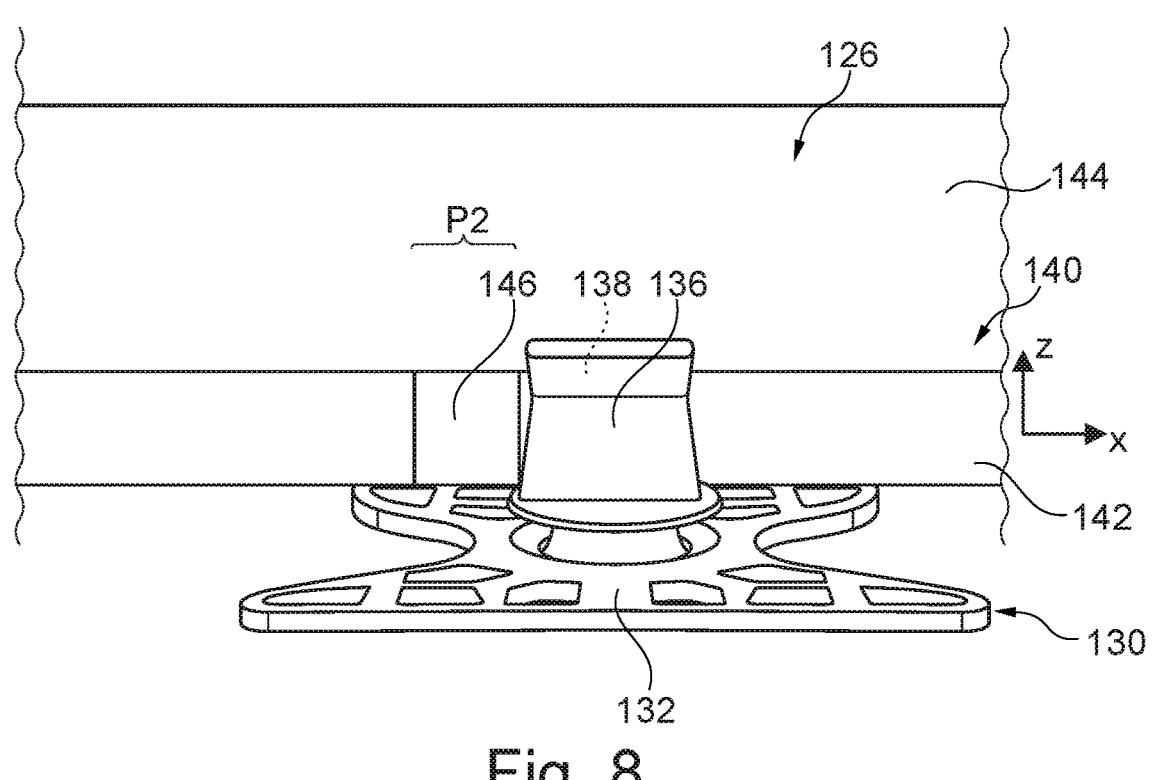
FIG. 8: shows a further perspective view corresponding substantially to FIG. 7, wherein the draw-in bar is displaced so far to the right that the profile section bears against the latching receiving element.

FIG. 4 shows one of the latching receiving elements 130. The latching receiving element 130 has a base 132. In the present case, the base 132 is in the form of a plate and comprises several holes 134 which serve for incorporating the latching receiving element 130 into the foam part 118.

Two latching tongues 136 project from the base 132. At the ends averted from the base 132, the latching tongues 136 each have a latching projection 138. The two latching tongues 136 are arranged spaced apart from each other, so that an intermediate space is arranged between the two latching tongues 136. The latching projections 138 face each other and partially close the intermediate space. The latching projections 138 act as barbs for the profile body 142 of the draw-in bar 140.

Figure 9:
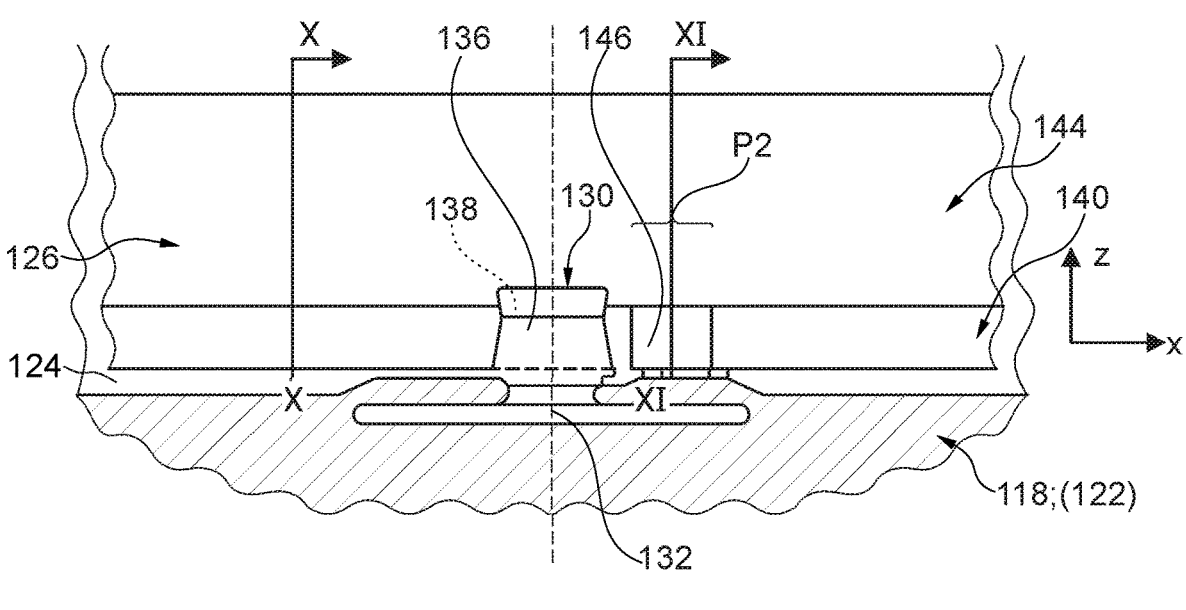
FIG. 9: shows a section through the foam part from FIG. 2 in the region of the latching receiving element incorporated by foaming and the draw-in bar latched into the latching receiving element.

As shown in the section of FIG. 9 in particular, the base 132 of the latching receiving element 130 is incorporated by foaming into the foam part 118 in such a way that the base 132 is completely surrounded by foam material, as a result of which the latching receiving element 130 is positively incorporated into the foam part 118. The two latching tongues 136 project into the recess 124 and are accessible in the recess 124 for a draw-in bar 140 to latch into.

The draw-in bar 140 has a profile body 142 and a seam tab 144. The profile body 142 and the seam tab 144 are fixedly connected to each other. The seam tab 144 has a largely planar form. The seam tab 144 is stitchable, in the present case stitched, to the cover 116. In the stitched state, the draw-in bar 140 is therefore a constituent part of the cover 116 and the latching receiving element 130 is a constituent part of the foam part 118.

The draw-in bar 140 and therefore the profile body 142 have an elongate extent. Direction indications used below are defined on the basis of the elongate extent of the profile body 142. The profile body 142 runs along a direction x of longitudinal extent. A draw-in bar 140 of curved design therefore defines a direction x of longitudinal extent that changes along the longitudinal extent of the draw-in bar 140. A first transverse direction y runs perpendicularly to the direction x of longitudinal extent and largely perpendicularly to the seam tab 144. A second transverse direction z runs perpendicularly to the direction x of longitudinal extent and perpendicularly to the first transverse direction y. In the present case, the seam tab 144 lies in an area spanned by the direction x of longitudinal extent and the second transverse direction z.

The profile body 142 is symmetrical to the area spanned by the direction x of longitudinal extent and the second transverse direction z. The profile body 142 is of arrow-shaped design. A tapered portion of the profile body 142 faces away from the seam tab 144.

The profile body 142 has first profile sections P1 and second profile sections P2, which alternate with each other, along the direction x of longitudinal extent. The profile body 142 is one-piece. The profile body 142 is manufactured in one piece.

The first profile sections P1 and the second profile sections P2 are manufactured in one piece.

Figures 10, 11:
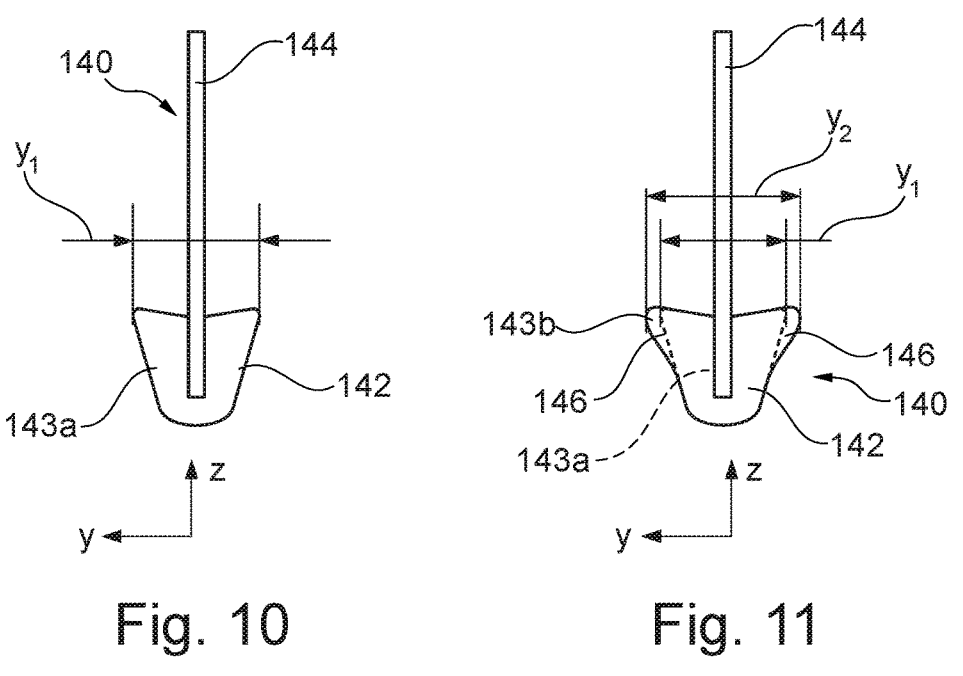
FIG. 10: shows a section through the draw-in bar along line X-X in FIG. 9, and FIG. 11: shows a section through the draw-in bar along line XI-XI in FIG. 9.

In the first profile sections P1, the profile body 142 has a basic cross section 143*a* which is illustrated in FIG. 10. The basic cross section 143*a* is preferably identical over the entire length of each of the first profile sections P1. The basic cross section 143*a* is dimensioned in such a way that the first profile sections P1 are displaceable in the intermediate space between the latching tongues 136 in the direction x of longitudinal extent.

The profile body 142 has a safety cross section 143*b* in the second profile sections P2. The safety cross section 143*b* projects beyond the basic cross section 143*a* on both sides in the first transverse direction y. For this purpose, the second profile section P2 has two projections 146, one projection 146 of which is oriented in the first transverse direction y and the other projection 146 of which is oriented counter to the first transverse direction y and which face away from each other. The safety cross section 143*b* is dimensioned in such a way that the second profile sections P1 are not insertable into the intermediate space between the latching tongues 136 in the direction x of longitudinal extent.

The length of the first profile sections P1 in the direction x of longitudinal extent is greater than the length of the latching tongues 136 in the direction x of longitudinal extent. For the purpose of fitting the cover 116 onto the foam part 118, partial sections of the first profile sections P1 of the profile bodies 142 are pushed into associated latching receiving elements 130. During the pushing-in process, a latching connection is made, in the case of which the profile body 142 initially pushes the correspondingly profiled latching tongues 136 apart, until the latching projections 138 on the latching tongues 136 are overcome and a partial section of the first profile section P1, said partial section having the basic cross section 143*a*, is held largely in the intermediate space between the latching tongues 136 and below the latching projections 138 acting as barbs. In this way, the cover 116 is connected to the latching receiving elements 130 of the foam part 118.

The basic cross section 143*a* of the profile body 142 has a first width y1 at its widest point. The safety cross section 143*b* of the profile body 142 has a second width y2 at its widest point. The second width y2 is greater than the first width y1. The intermediate space between the latching tongues 136 has a third width y3 at its widest point. The second width y2 is preferably greater than the third width y3. The first width y1, the second width y2 and the third width y3 are matched to one another in such a way that the first profile section P1 of the profile body 142, said first profile section having the basic cross section 143*a*, is displaceable relative to the latching tongues 136 in the direction x of longitudinal extent, possibly after a small amount of friction has been overcome, until the second profile section P2 having the safety cross section 143*b* comes into interlocking contact with at least one of the latching tongues 136. Further displacement of the second profile section P2 is therefore avoided. As a result, a formation of folds in the cover 116 is avoided, it being possible for this formation of folds to result from excessively large relative displacements between the latching receiving elements 130 and the draw-in bars 140 when draw-in bars 140 known from the prior art are used.

The features which are disclosed in the above description, the claims and the figures can be of significance both individually and in combination for the implementation of the invention in its various refinements, in so far as they remain within the scope of protection of the claims.

LIST OF REFERENCE SIGNS

100 Vehicle seat
102 Seat part
104 Backrest
106 Fitting
108 Headrest
110 Longitudinal adjuster
112 Upper track
114 Lower track
116 Cover (of the seat part 102)
118 Foam part (of the seat part 102)
120 Cover (of the backrest 104)
122 Foam part (of the backrest 104)
124 Recess
126 Cover fastening system 130 Latching receiving element
132 Base
134 Hole
136 Latching tongue
138 Latching projection
140 Draw-in bar
142 Profile body
143*a* Basic cross section
143*b* Safety cross section
144 Seam tab
146 Projection
P1 First profile section (having the basic cross section 143*a*)
P2 Second profile section (having the safety cross section 143*b*)
x Direction of longitudinal extent
y First transverse direction
y1 First width
y2 Second width
y3 Third width
z Second transverse direction

What is claimed is:

1. A draw-in bar for holding a cover of a vehicle seat on at least one latching receiving element connected to a foam part of the vehicle seat; the draw-in bar having a profile body, wherein the profile body has at least one first profile section with a basic cross section that is constant along a direction of longitudinal extent of the profile body,
wherein the profile body has at least one second profile section with a safety cross section, wherein the safety cross section projects beyond the basic cross section of the profile body in at least one transverse direction in the second profile section,
wherein the safety cross-section blocks insertion of the at least one second profile section into the at least one latch receiving element.

2. The draw-in bar according to claim 1, wherein the profile body has a safety cross section in each of a plurality of second profile sections spaced apart from each other in the direction of longitudinal extent.

3. The draw-in bar according to claim 1, wherein the at least one safety cross section projects beyond the basic cross section in a first transverse direction, but corresponds to the basic cross section in a second transverse direction running perpendicularly to the first transverse direction.

4. The draw-in bar according to claim 1, wherein the at least one safety cross section of the profile body differs from the basic cross section on account of at least one material accumulation in the form of a projection.

5. The draw-in bar according to claim 1, wherein the draw-in bar has a seam tab which is connected to the profile body and is stitchable to a cover material of the cover.

6. A cover fastening system, having a latching receiving element and a draw-in bar according to claim 1, wherein the draw-in bar is connectable to the latching receiving element by a latching connection.

7. The cover fastening system according to claim 6, wherein the latching receiving element has a base and at least one latching tongue connected to the base and having at least one latching projection acting as a barb for the profile body.

8. The cover fastening system according to claim 7, wherein the latching receiving element has two latching tongues which are arranged and designed in such a way that the two latching tongues can be pushed apart by the profile body by pushing the profile body of the draw-in bar between the two latching tongues, as a result of which the latching projections of the latching tongues can be guided past the profile body and in this way a first profile section of the profile body, said first profile section having the basic cross section, can be inserted into an intermediate space between the latching tongues.

9. The cover fastening system according to claim 8, wherein the basic cross section of the profile body has a first width, the safety cross section of the profile body has a second width, and the intermediate space between the latching tongues has a third width, wherein the first width, the second width and the third width are matched to each other in such a way that the first profile section of the profile body, said first profile section having the basic cross section, is displaceable relative to the latching tongues in the direction of longitudinal extent until the second profile section having the safety cross section comes into interlocking contact with at least one of the latching tongues.

10. A vehicle seat, having at least one foam part and at least one cover covering the at least one foam part, wherein the cover is connected to the at least one foam part by at least one cover fastening system according to ene of claim 6.

11. The vehicle seat of claim 10, wherein sliding of the draw-in bar relative to the latching receiving element is prevented.

12. The vehicle seat of claim 10, wherein the profile body is configured to prevent a displacement in the direction of longitudinal extent.

13. The vehicle seat of claim 10, wherein in interaction with the latching receiving element, the profile body is configured to prevent a displacement in the longitudinal direction.

14. The vehicle seat of claim 10, wherein only the at least one first profile section of the draw-in bar is configured to slide within the latching receiving element.

15. The vehicle seat of claim 10, wherein after a limited relative displacement between the first profile section and the latching receiving element, the draw-in bar is secured against further displacement in the latching receiving element by the safety cross section.

16. The vehicle seat of claim 10, wherein a width of the safety cross section prevents passage of the at least one second profile section through the latching receiving element.

17. The vehicle seat of claim 10, wherein the latching receiving element comprises two latching tongues with an intermediate space between the two latching tongues, wherein the first profile section is displaceable in the intermediate space between the latching tongues, wherein the second profile section is not insertable into the intermediate space between the latching tongues.

\* \* \* \* \*